US006570491B1

(12) United States Patent
Bastholm

(10) Patent No.: US 6,570,491 B1
(45) Date of Patent: May 27, 2003

(54) ASSOCIATING A HAND CONTROL UNIT

(75) Inventor: Jeppe Christian Bastholm, Sønderborg (DK)

(73) Assignee: Linak A/S, Guderup (DK)

( * ) Notice: Subject to any disclaimer, the term of this patent is extended or adjusted under 35 U.S.C. 154(b) by 7 days.

(21) Appl. No.: 09/435,205

(22) Filed: Nov. 5, 1999

(30) Foreign Application Priority Data

Nov. 5, 1998 (DK) ........................................ 1998 01434

(51) Int. Cl.[7] ................................................ H04Q 1/00

(52) U.S. Cl. ................................ 340/10.3; 340/825.69; 340/825.22; 340/10.5

(58) Field of Search ............................ 340/10.3, 10.31, 340/10.4, 10.41, 825.69, 5.62, 825.22, 10.5

(56) References Cited

U.S. PATENT DOCUMENTS 4,510,495 A * 4/1985 Sigrimis .................... 340/10.3
5,351,052 A * 9/1994 D'Hont ..................... 340/10.4
5,887,176 A * 3/1999 Griffith ...................... 340/10.3
5,940,006 A * 8/1999 MacLellan ................. 340/10.3
6,211,773 B1 * 4/2001 Adamec ..................... 340/5.6

* cited by examiner

*Primary Examiner*—Brian Zimmerman
(74) *Attorney, Agent, or Firm*—Dykema Gossett PLLC

(57) ABSTRACT

A remote control system includes at least one hand control (2) and one or more control units (4). Each control units transmits a signal with a unique frequency. The hand control receives this signal from the control unit, which appears the strongest to the hand control receiver, as well as transmits a signal with a frequency which is a whole multiple of the received signal. The advantage of the system is that an arbitrary hand control automatically adapts itself to the control unit from which the signal is strongest and subsequently communicates with the control unit. The system may be constructed such that one-way or two-way communication may take place. In one embodiment, the system is exclusively composed of standard components, the spreading on the components being used for forming the unique signal. The system lends itself for all forms of furniture equipped with motor driven adjustment facilities.

13 Claims, 7 Drawing Sheets

ASSOCIATING A HAND CONTROL UNIT

BACKGROUND OF THE INVENTION

1. Field of the Invention

The present invention relates to a remote control system, in particular for adjustable articles of furniture and office, hospital and nursing home equipment, such as beds, chairs, tables, patient lifters, etc. The invention also relates to an adjustable article of furniture and to a power driven actuator.

2. The Prior Art

The description of the invention will be based on hospital beds, as these illustrate the problems underlying the invention quite well.

A hospital bed has an electrical appliance with a linear actuator for adjusting the backrest part of a hinged support section as well as an actuator for adjusting its legrest part. In addition, the support section as a whole may be raised and lowered, as well as be caused to assume a tilted position (Trendelenburg's or anti-Trendelenburg's position). Adjustment of the support section as a whole is performed by two actuators. Beds of this type are described e.g. in U.S. Pats. No. 5,161,274 and 5,205,004, both to J. Nesbit Evans & Co. Ltd.

The actuators are connected to a control box, which also contains a power supply. The actuators and the control box are positioned below the bottom of the bed. The control box is operated by a hand control connected to it by wire. The hand control must be capable of being operated by the patient himself and also by the hospital staff, such as patient care staff, nurses, orderlies, doctors, and cleaning staff.

The wire for the hand control constitutes a problem per se, and this is not lessened by the fact that it must be relatively long even though a helically twisted wire is used. Lying in bed, the patient must be able to reach and operate the hand control, while the staff must be able to operate it, standing at the foot end of the bed. Further, the wire must not be in the way when the patient goes to bed or is taken to bed by the staff, nor of course when the patient gets out of bed. This may take place from both the one and the other side of the bed. Of course, a hand control might be arranged at each end of the bed, but this is much too expensive. After each use, the bed must be washed, and here the helically twisted wire constitutes a problem since it is difficult to clean. Another drawback of the wire is that, because of its length and the movement of it from one end to the other, it will frequently get squeezed between the movable parts of the bed and thereby be damaged or even be cut completely.

To avoid the wire for the hand control, a wireless hand control might be considered, but this presents other problems. One of the problems is actually the storage of the hand control. It must be readily accessible for both patient and staff. In an emergency it is no good that the patient has packed the hand control away in a side table, if, e.g., the bed is to be placed in Trendelenburg's position immediately. At a hospital with several hundreds of beds it is altogether no good having a corresponding number of loose hand controls. Connecting these to the beds by a wire is no solution to the problems.

A hand control based on an infrared transmitter moreover involves a problem of mounting the receiver at a place accessible to all parties. Lying in bed, the patient will naturally direct the hand control toward the foot end, while the staff will direct it toward the head end, which is psychologically unfortunate for the patient.

The other common wireless option is a hand control based on radio communication. A problem of using such a solution where several beds are frequently placed in the same room, like at a hospital, is that the activation of a hand control must only cause a reaction from precisely the desired bed. Therefore, it is necessary to use hand controls which are dedicated to communicating precisely with a given bed, and this emphasizes the problem of keeping track of the individual hand controls. Now there must not only be one for each bed, but a quite specific hand control. One way of performing the dedication of the hand control is to mount a code recognition circuit in the individual receiver. This, however, involves the use of rather complicated electronics, and therefore adds to the costs, and radio communication per se is more expensive than infrared communication. Further, it gives rise to considerations that the allocated frequency ranges are crowded, involving risks of interference, and that radio communication per se presents a latent risk of operational disturbances of the often highly sensitive electronic equipment which is used at hospitals.

Considering the problems, it is thus not evident to change from a wired hand control to a wireless one, particularly not when the solution previously used is the absolutely cheapest one seen in relation to a wireless control.

The object of the invention is to provide a wireless remote control system in which a dedicated remote control for operating each individual unit is avoided, while ensuring that only one selected unit can be operated at a time.

SUMMARY OF THE INVENTION

Accordingly, the invention provides a remote control system which is characterized by

- utilizing at least one hand control and one or more control units,
- the hand control and the control units comprising transmit and receive antennas,
- the control units including a transmitter for transmitting a signal with a frequency which is unique to the individual control unit,
- the remote control including a receiver for reception of this signal from the control unit from which the signal is strongest relative to the hand control, as well as a transmitter for transmitting a signal with a frequency which is a whole multiple of the received signal and, via a phase locking circuit, is in phase with the received signal, and means for coding the transmitted signal with instructions,
- the control units including a receiver for receiving the signal from the hand control, as well as means for determining whether the received signal is in phase with the signal formed by the circuit of the control unit, and means for decoding and executing the instructions on the received signal.

With this embodiment of a remote control system, an arbitrary hand control in the system can adapt itself to the control unit from which the signal is strongest, and subsequently communicate with the control unit. Thus, there is no need for hand controls which are dedicated to the individual control unit, as an arbitrary control unit may be used in connection with all the control units. If it is desired to communicate with a specific control unit, then it is just necessary to assume a position where it is known with certainty that the signal from there is the strongest.

Taking hospital conditions as an example again, it is now possible to equip the patients with an arbitrary hand control for the control of the bed which they might be given, just as the staff may be equipped with a single remote control which can operate all the beds. In terms of organizing, there are substantially no limits to the administration of the hand controls, and, e.g., a remote control might conceivably be placed in a holder on each bed or the associated side table and one in a holder on the wall or the door to the ward for use by the staff.

The inventive concept provides several options of realizing the invention adapted to specific fields of use, and the invention may also be used where infrared communication has traditionally been used previously. The remote control may thus be us ed in connection with TV, video players, hi-fi systems, etc., it being ensured of course that the signal of the remote control does not interfere with the radio/television signal.

The remote control system may be constructed such that the control units constantly transmit signals, but where this is not desired for some reason, the system may be arranged so that the transmitters of the control units are normally turned off and are turned on only upon activation of a remote control, understood in the way that it is only the closest one or ones within a given radius from the remote control that are turned on.

In case of, e.g., beds, this also applies to sickbeds, beds in dwellings and at hotels, the range of the transmitter need not be very great in reality, since the user is normally in bed or quite close to it, and it may even be an advantage to construct the remote control system such that the range is quite short. The same problems actually apply to practically all types of adjustable articles of furniture, including office furniture. In these cases, the structure may be made simple, just as the consumption of energy will be low. The extent and shape of the field may moreover be determined by the antenna means used, and a loop of wire is thus particularly useful in connection with furniture. The field is here within the boundary of the loop and perpendicular to it, while radiation outside the boundary of the loop has a modest range.

In some situations one-way communication is sufficient, viz. the remote control can communicate with the control unit, but in other situations it is desirable with a duplex where the control unit can send information back to the remote control. In such an embodiment, the control unit is provided with means for coding the transmitted signal with instructions, while the hand control has means for decoding and executing the instructions on the received signal.

Rather than manufacturing the control units intentionally with a unique signal, which is complicated in terms of production, advantage is taken of the fact that electronic components may be manufactured with given values of tolerance. It is realized in this connection that with quite ordinary standard components a unique signal is obtained because of the spreading on their value. The components have a value +/− a tolerance and this is this spreading in the value, which is exploited to obtain the unique signals. Using components with the same value will result in a signal with a unique frequency due to the deviations in the values within the tolerance given. Although, hereby, only the order of magnitude of the frequency of the signal is known and not the exact value, this is in fact quite immaterial since automatic phase locking to the signal takes place. The use of standard components has evident advantages in terms of production, just as standard components per se give a lower cost price. This means that a remote control system according to the invention will be able to compete with a solution with a cabled control.

In an embodiment of the invention, coding of the transmitted signals with instructions may take place by phase-shifting selected phases 180 degrees, so that a shifted phase, e.g., represents a digital 0 and a non-shifted phase represents a digital 1, and a decoder, upon reception of the signal, can detect whether the individual phases are phase-shifted relatively to what is expected.

In order to be able to determine quite uniquely whether the signal has been phase-shifted or not, the control unit is arranged such that its transmitter sweeps in narrow ranges.

The invention also relates to an adjustable article of furniture, preferably a bed, a chair and a table equipped with at least an electric motor for performing adjustments of the article of furniture, the article being equipped with a remote control system as stated above. It should be stressed that the term article of furniture is used in its widest sense and also covers hospital, nursing home, hospice, clinic, institution, office and hotel furniture.

In a particular embodiment of the article of furniture, the antenna means, preferably in the form of a wire loop, are integrated in it. This may be in a chassis frame or in a tabletop.

The invention moreover relates to a power driven actuator and a power driven lifting column equipped with a remote control system as stated above. Power driven actuator or lifting column should also be taken to mean a system consisting of several power driven actuators or lifting columns having a common control.

Besides the invention relates to an article of furniture, preferably a bed, a chair or a table having at least one adjustable element, such as a backrest of a bed or chair or a tabletop of a table, a drive unit, such as an actuator or lifting column with an electric motor to execute the adjustments of said adjustable element, a control box with an electrical or electronic control for operating said drive unit, a hand control comprising a cabinet with keys for communication with said control box, wherein said furniture is having an antenna means, said control box furnished with or being connected to a radio receiver and said receiver being connected to the antenna means, and said hand control being furnished with a radio transmitter and antenna means for communicating with said radio receiver for operating said adjustable element of said article of furniture.

An embodiment of the invention will be described below with reference to the accompanying drawings.

DETAILED DESCRIPTION OF THE PREFERRED EMBODIMENTS

Figure 1:
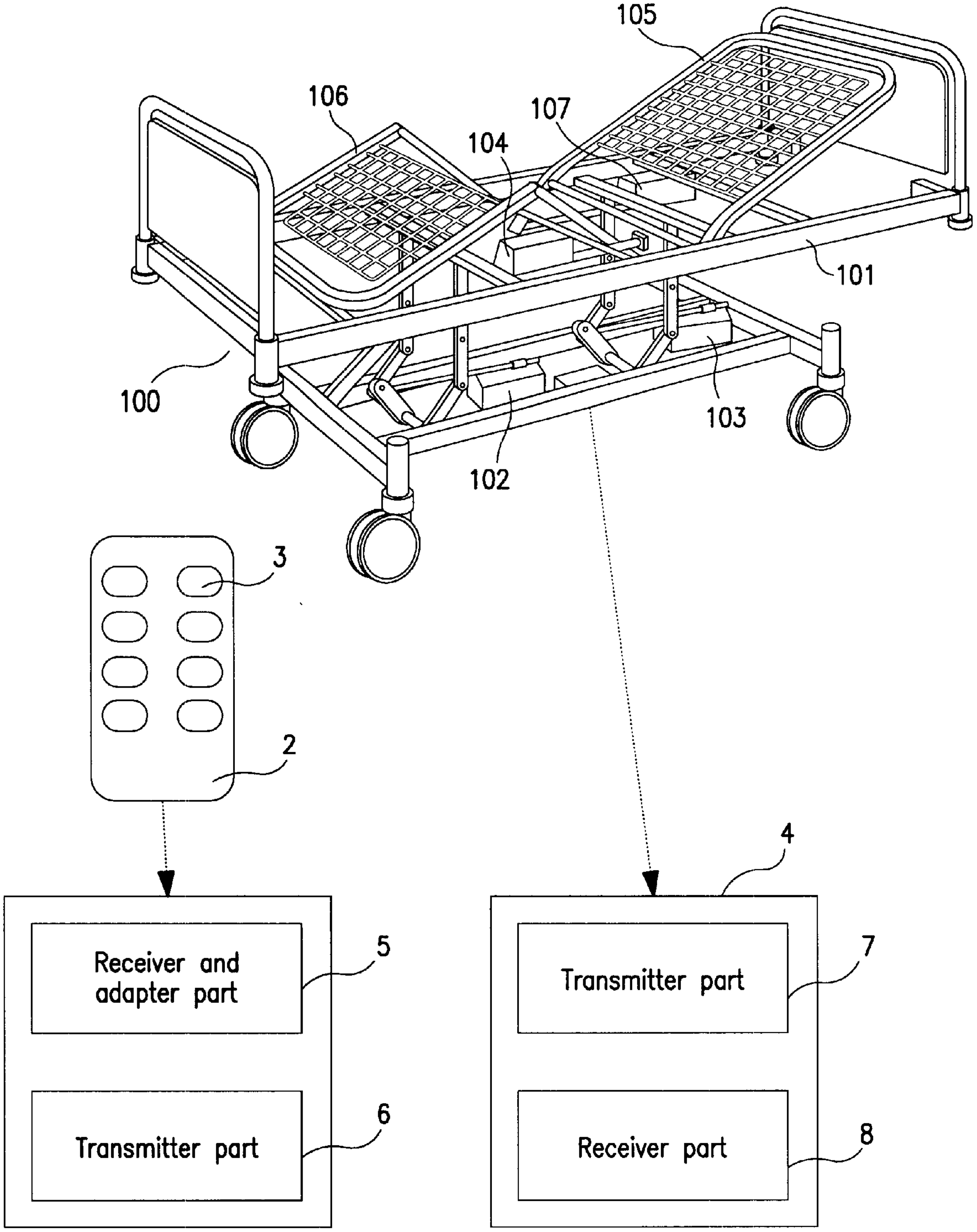
FIG. 1 shows the remote control system used on a hospital bed, together with the major components of the control unit and the hand control.

FIG. 1 shows a hospital bed 100 having a wheeled chassis on which there is an intermediate frame 101 with a hinged mattress support section. The intermediate frame 101 may be raised and lowered or be caused to assume a position tilted about a transverse axis by two linear actuators 102, 103. The support section comprises a backrest part 105 likewise adjustable by a linear actuator 104. The support section moreover has a hinged legrest part 106, which may likewise be adjusted by a linear actuator 107. The linear actuators are controlled by a control unit 4 which is operated by a wireless hand control 2 having a plurality of keys 3 for the various functions. The hand control 2 comprises a receiver and adapter part 5 and a transmitter part 6. The control unit includes a transmitter part 7 and a receiver part 8.

Figure 2:
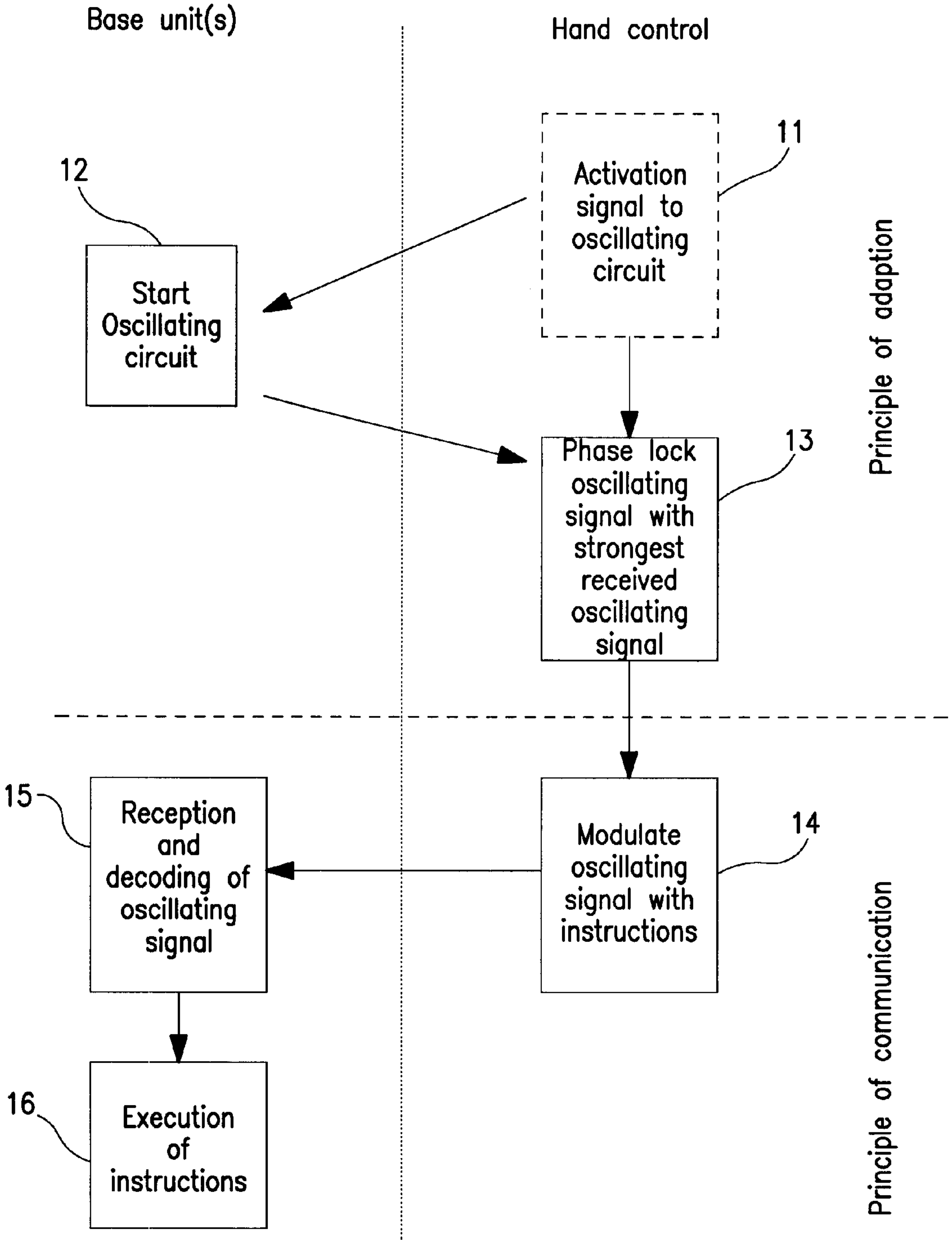
FIG. 2 illustrates the principle of the remote control system by illustrating the principle of adaptation and the principle of communication.

FIG. 2 shows a diagram which illustrates how the hand control adapts itself to the individual control unit 4, following which it can communicate with the control unit 4. FIG. 2 will be explained in detail below by first explaining the principle of adaptation and then the principle of communication.

Normally, the remote control system will be designed so that the control units are constantly active. As an option, in step 11, the transmitter part 6 of the hand control may be constructed such that an activation signal is emitted when a key 3 on the hand control 2 is pressed. This activation signal causes all control units within a given range to be activated.

The transmitter part 7 of the control unit comprises a circuit which is activated in step 12 by detection of an activation signal. All the control units within the given range now begin to emit a signal with a frequency which is individual for the individual control unit 4.

The receiver and adapter part 5 of the hand control includes a phase locking circuit, which allows the hand control to form a signal which is phase-locked to the frequency from the strongest signal emitted by the transmitter part 7 of the control unit. In step 13, the signal of the hand control is phase-locked to the signal from the control unit/bed which is closest to the hand control 2.

The hand control 2 is now adapted to emit a signal which is in phase with the strongest signal received from the closest control unit 4.

To avoid the situation that the hand control 2 and the control unit 4 mix the received and transmitted signals, frequency dividers are used for dividing the frequency of the signals. This means that transmitted and received signals may be separated as the signals hereby get different frequencies.

The hand control 2 is thus adapted to be able to communicate with a specific control unit 4, which will be explained more fully below.

In connection with the communication of data from hand control 2 to control unit 4, the individual control units are designed such that they only execute instructions which arrive in connection with a signal having a frequency which corresponds to the frequency of the circuit of the control unit. This is achieved in that the receiver part 8 in the control unit 4 is designed such that it has a very narrow bandwidth.

After phase locking, the hand control 2 is ready to send messages to the control unit 4, and in step 14 the transmitter part 6 modulates instructions on the transmitted phase-locked signal. The instructions depend on which key 3 on the hand control 2 is pressed.

In step 15, the control unit 4 receives the modulated signal and reads the instructions from it by using a decoder, and then in step 16 the control unit 4 ensures that these instructions are executed.

The structure of the receiver and adapter part 5 and the transmitter part 6 of the hand control will be explained more fully below.

Figure 3:
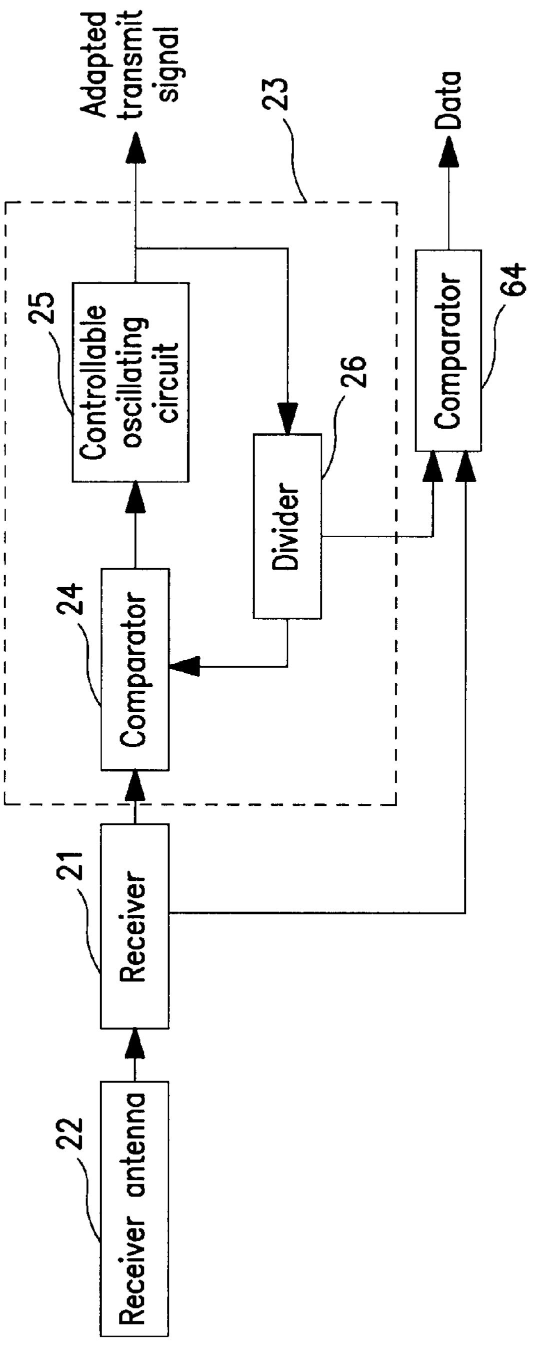
FIG. 3 shows a block diagram of the receiver and adapter part of the hand control.

FIG. 3 shows the structure of the receiver and adapter part 5. There is a receiver 21 which receives the strongest signal via an antenna 22. This signal is passed further on to the adapter part 23 which is constructed as a control loop. This loop has a comparator 24 which compares the phase of the received signal with the phase of a divided signal which arrives from a controllable circuit 25. If the phases of the two signals differ, the frequency of the signal in the controllable circuit 25 is adjusted.

For the two signals to be compared, the controllable signal must be divided so as to correspond to the signal from the control unit 4 which has been divided correspondingly before transmission. The divider 26 may, e.g., be constructed as a digital divider circuit. At the output of the adapter part 23 there is a transmit signal where the phase is in agreement with the received signal, but where the frequency is a whole multiple greater than the received signal.

Figure 4:
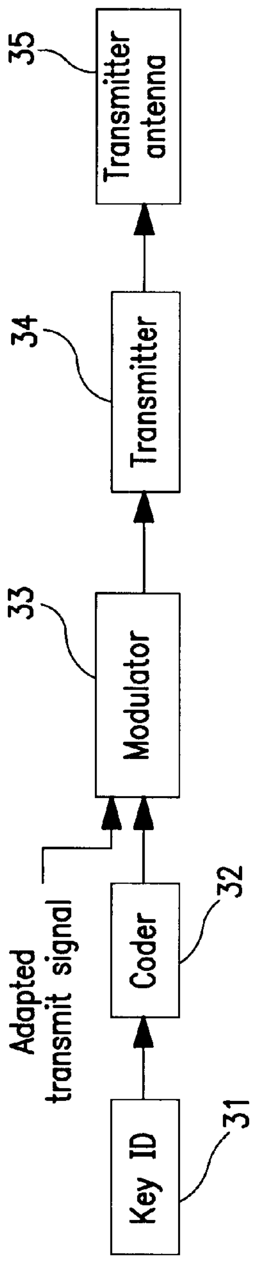
FIG. 4 shows a block diagram of the transmitter part of the hand control.

FIG. 4 illustrates the structure of the transmitter part 6 of the hand control. Upon activation of a key 3, identification means 31 identify the key 3 that has been activated. This information is passed on to a coder 3 which converts the information into a code which can be recognized by the receiver part 8 of the control unit. This code is modulated on the transmit signal by a modulator 33, and then a transmitter 34 transmits the signal via a transmitter antenna 35.

Figure 5:
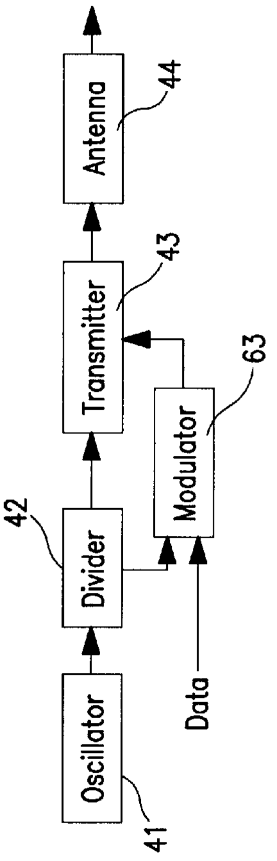
FIG. 5 shows a block diagram of the transmitter part of the control unit.

FIG. 5 illustrates the structure of the transmitter part 7 of the control unit. An oscillator 41 is provided, composed of a circuit, e.g., formed of a coil and a resistor. It is important that the frequency of the circuit in the individual control units varies from bed to bed. It is expedient in this connection to use the same components in the individual receiver systems and to utilize the inaccuracy present in the component values for achieving a varying oscillation circuit. Thus, quite unique receiver systems are achieved, and they are moreover easier and cheaper to produce.

In order not to confuse the signal with the signal transmitted from the transmitter part of the hand control, a divider 42 is used for dividing the frequency by an integer. Use is then made of a transmitter 43 which transmits the signal via an antenna 44.

Figure 6:
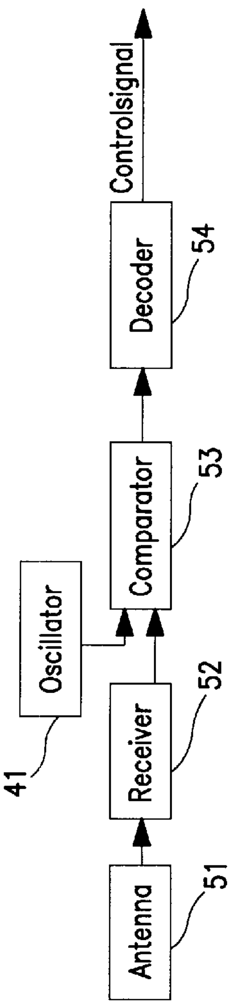
FIG. 6 shows a block diagram of the receiver part of the control unit.

FIG. 6 illustrates the structure of the receiver part 8 of the control unit. The receiver part 8 uses a receiver 52 which, via an antenna 51, receives the signal transmitted from the transmitter part 6 of the hand control. This signal is compared with the signal which is formed by the oscillator 41 of the receiver part. If a comparator 53 determines that the two signals are in phase, the information from the received signal is decoded via a decoder 54 and is converted into a control signal which activates the desired part of the bed.

Figure 7:
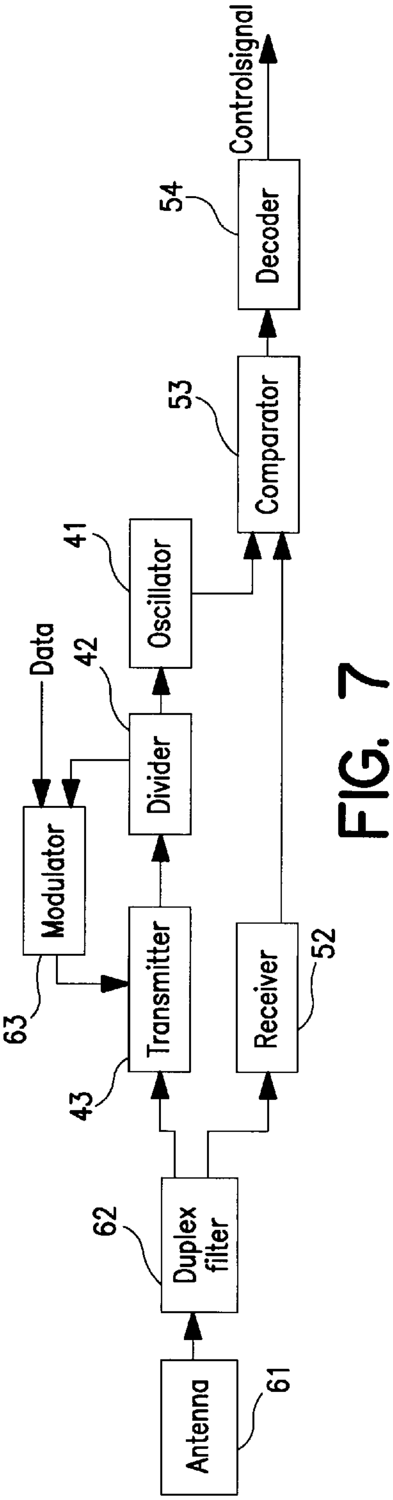
FIG. 7 shows a block diagram of the control unit with the transmitter part and the receiver part assembled.

FIG. 7 illustrates an assembly of the receiver part 8 and the transmitter part 7 of the control unit, using a common antenna 61 via a duplex filter 62.

In an embodiment, the modulation of information on this signal may take place in that the phases of the transmitted signal are shifted 180 degrees. Thus, a shifted phase may represent a digital 0, and a non-shifted phase may represent a digital 1. In this case, the receiver part of the control unit must include means that detect how the individual phases are oriented.

The embodiment described in the foregoing has a one-way communication, viz. from the hand control to the control unit. For example, it might be desirable to know the angular position of the bed when it is turned to a Trendelenburg's position or anti-Trendelenburg's position. For this purpose, the bed may be provided with an angular detector, or the angle may be measured indirectly by the mutual position of the actuators 102, 103. The signal may be fed to a modulator 63 connected to the divider 42 and the transmitter 43. In the hand control, the modulated signal is fed from the receiver 21 to a comparator 64 connected to the divider 26. The signal may be fed from the comparator 64 to a display in the hand control which displays the angular position.

Figures 8, 8A, 8B:
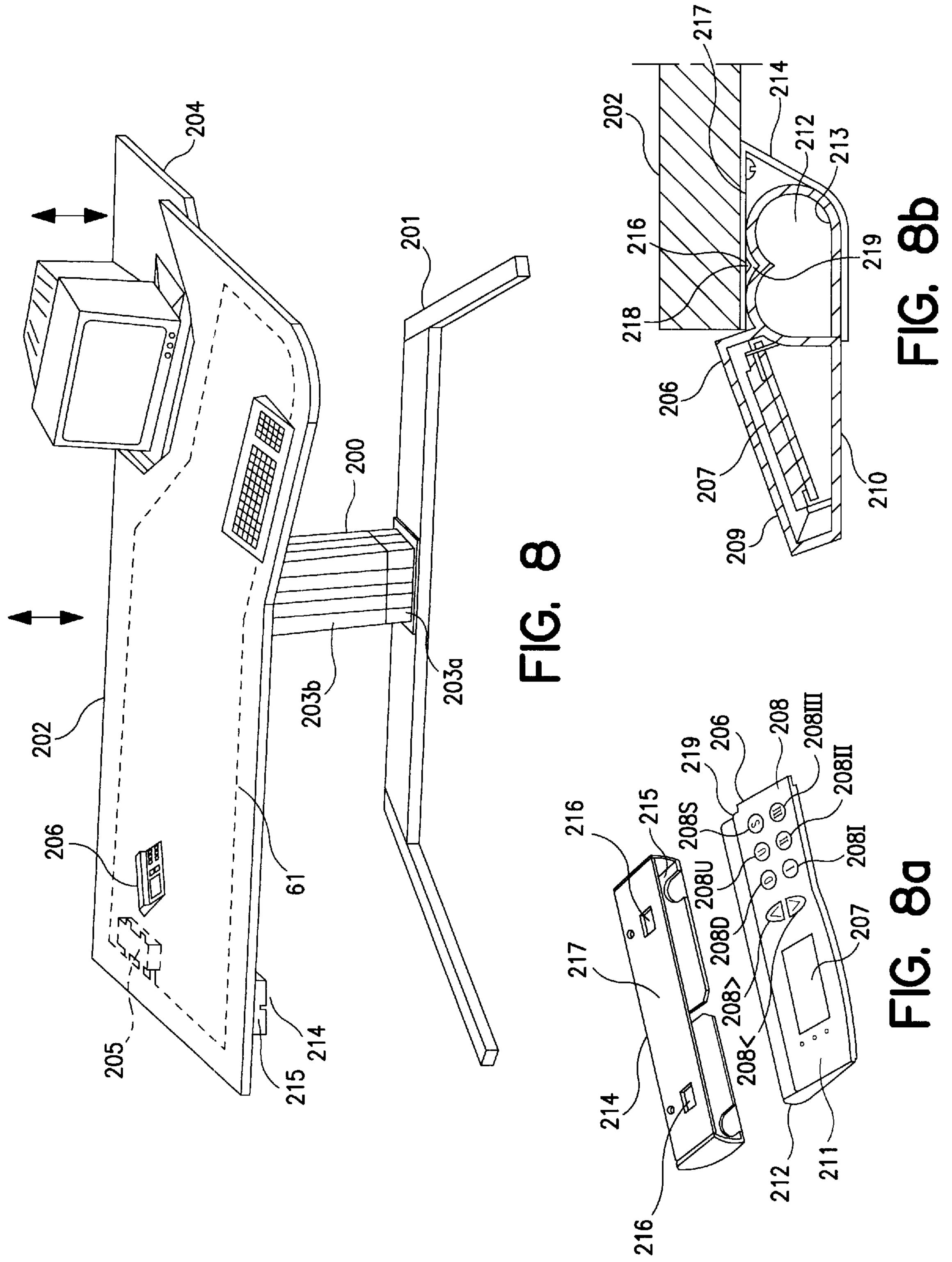
FIG. 8 shows the remote control system used in connection with a height adjustable desk.
FIG. 8*a* shows an embodiment of the hand control indicated in FIG. 8.
FIG. 8*b* shows a cross section of the hand control inserted into a holder mounted at the edge of the tabletop.

FIG. 8 of the drawing shows the use of the remote control system in connection with a height adjustable table. This includes a lifting column 200 mounted with the lower end in a foot 201, and a main tabletop 202 is mounted on the upper end of the column. The column includes two telescopic hollow profiles 203*a*,203*b* and is driven by a linear actuator placed in the interior of the innermost profile 203*a*. The motor of the actuator is equipped with Hall sensors. A signal indicative of the table height may be tapped from these Hall sensors. As apparent from the figure the main tabletop 202 has an auxiliary tabletop 204, which is height adjustable, e.g. by means of an linear actuator having an motor with Hall sensors. A signal indicative of the auxiliary table height may be tapped from these Hall sensors.

Here, the remote control system is likewise a duplex system wherein a signal may be transmitted from the control unit 205 placed under the table top to the hand control 206 with the table height concerned, which may be read on a display 207 (see FIG. 8*b*).

As seen in FIGS. 8*a* and 8*b*, the hand control 206 includes a sideways elongated cabinet 209 with a plane bottom 210 acting as a foot for standing on the tabletop. The display 207 together with keys 208 is placed in an upward facing control 211 surface inclined towards the user. The rear side of the hand control has a compartment 212 for two rows of cylindrical batteries. Access to the compartment is through a lid 213 closed with a catch lock. The plane bottom 210 and the weight of the batteries (six all together) means that the hand control is stable on the tabletop. Additionally, the bottom may be furnished with friction pads. Instead of resting on the tabletop the hand control could be placed in a holder 214 having a cavity 215 for the rear side of the hand control. With the weight of the batteries, which is the essential part of the overall weight of the hand control, resting in the holder the hand control rest in a secure manner in the holder. Additionally, the hand control is retained by two resilient members 216 protruding into the cavity from the ceiling 217 of the holder. The resilient members 216 are tongues bearing a cam 218 resting in the groove 219 between the two cylindrical portions of the compartment for the batteries. The holder can be fixed to the underside of the tabletop 202 by means of screws which could be reached through holes in the holder alternatively fixed by means of an adhesive. Resting in the holder the control surface is exposed to the user and could be operated by the user. When removing the hand control from the holder the tongues are displaced into respective openings in the ceiling of the holder.

Figure 9:
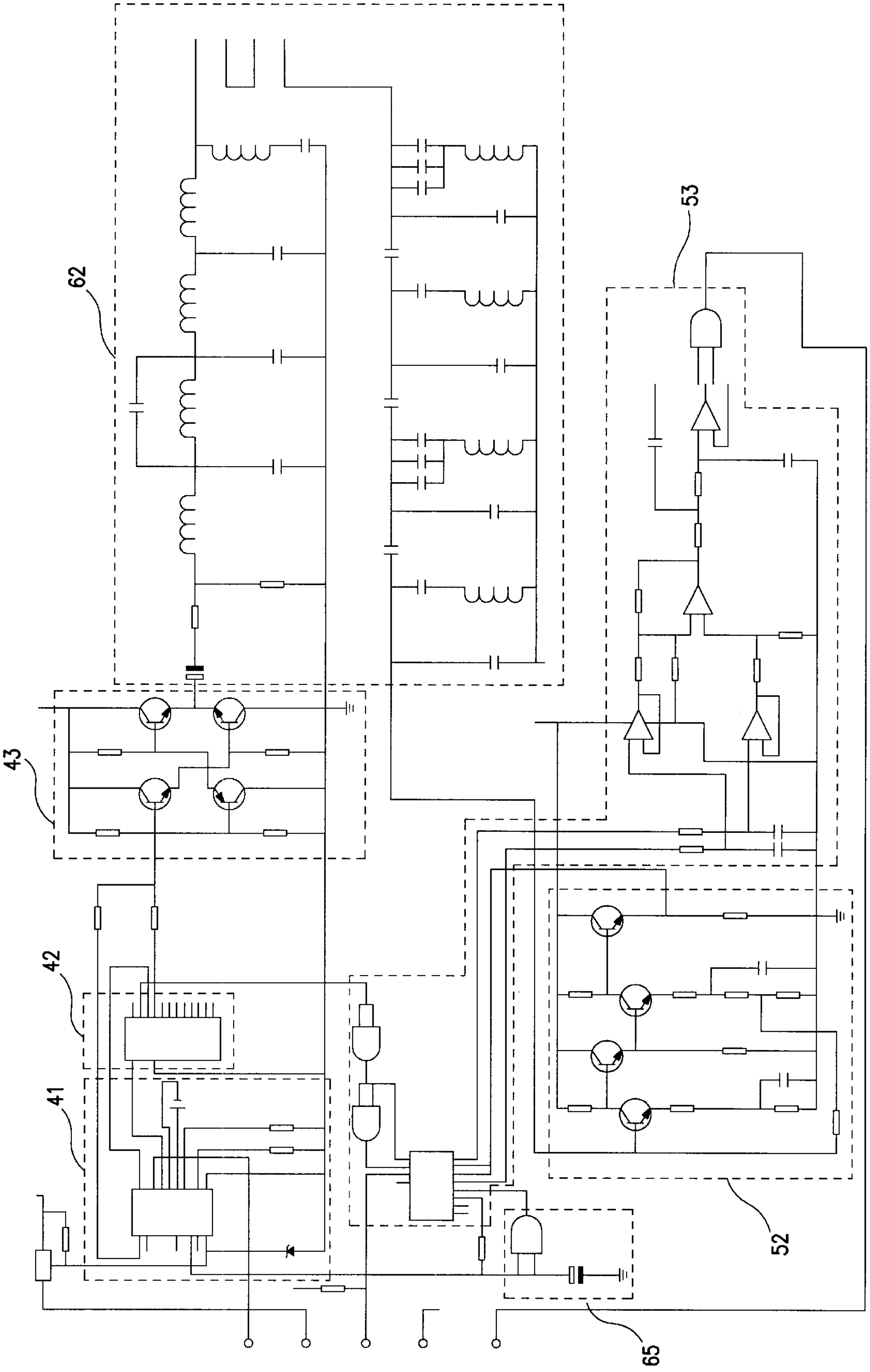
FIG. 9 shows the electronic circuit of the hand control.
Figure 10:
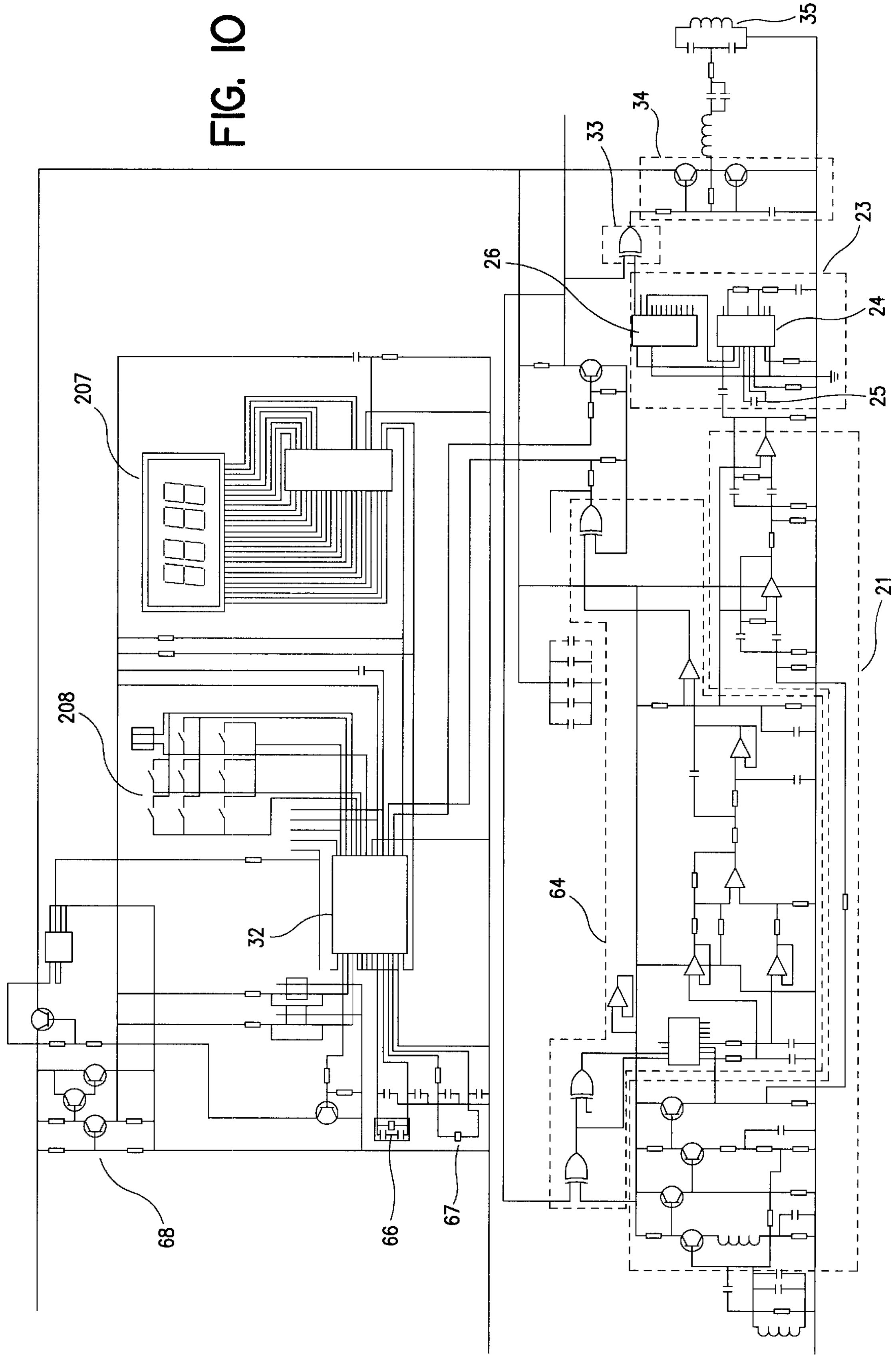
FIG. 10 shows the electronic circuit of the control unit.

FIGS. 9 and 10 show an example of the electronic circuit of the hand control and of the control unit, respectively. The embodiment is directed to a design for use in connection with tables. In the figures, the individual parts in the block diagrams of FIGS. 4 and 7 are identified by the same reference numerals.

With reference to FIG. 9, the oscillator 41 of the control unit is an integrated circuit, in which a signal having a frequency of the order of 160 kHz is currently generated. In order to be able to determine quite uniquely whether the signal has been phase-shifted or not, there is a sweeper 65 such that the transmitter sweeps in narrow ranges, e.g., in the order of 600 Hz. From there, the signal is fed to a divider 42, which is likewise an integrated circuit in which the signal is divided eight times to a frequency of the order of 20 kHz. This signal is passed further on to the transmitter, which is formed by an amplifier 43 in the form of a traditional transistor amplifier. The signal thus amplified is passed via the duplex filter 62 to the antenna 61, from where a signal is constantly emitted, having a frequency of the order of 20 kHz unique to the control unit. The antenna 61 is a wire loop attached to the underside of the tabletop 202. As the wire loop is placed along the edge of the tabletop the field is in essentially limited within the boundaries of the tabletop and perpendicular thereto.

Another part of the signal from the IC circuit 41 is divided four times in the divider 42 to a signal having a frequency of the order of 40 kHz, which is sent back to the IC circuit which contains a phase modulator 63 as a standard component in addition to the oscillator. Data from the control of the actuator specifying the height of the tabletop are fed to the IC circuit in which the 40 kHz signal is phase-modulated with the data. The signal thus modulated is fed to the transmitter 43 and further to the antenna via the duplex filter. When there is no communication between a control unit and a hand control, the signal is used for transmitting an identification signal in the form of a ping.

A signal with a frequency of the order of 80 kHz and with data received from a remote control is fed from the antenna to the duplex filter 62 and further on to the receiver 52, which is a traditional transistor amplifier. From there, the signal is fed to the comparator 52 which contains a filter of operational amplifiers and a single logic component, viz. an inverting gate. The carrier wave is separated in the filter, and the data signal is fed to the gate in which it is inverted. It should be mentioned that the decoder (54 in FIG. 6 and7) in the present embodiment is integrated in the control box for the lifting column.

With reference to FIG. 10, the receiver antenna 22 of the hand control is formed by a coil. The unique signal of the order of 20 kHz is fed from the antenna to the receiver 21, which is formed by a traditional transistor amplifier and a filter based on two operational amplifiers. From the filter, the unique signal is fed to the phase-locking circuit 23 which comprises a crystal oscillator 25, a divider 24 and a comparator 26, the latter in the form of IC circuits. The oscillator creates a signal with a frequency of the order of 80 kHz which is divided by four to a frequency of the order of 20 kHz or the same as the received signal. The thus adapted transmit signal with the frequency of the order of 80 kHz is subsequently fed to a phase modulator 33 in the form of a logic circuit (exclusive OR gate).

A data signal, e.g., to have the tabletop raised more, is generated by pressing the key concerned on the keyboard 208. The data signal is fed to a processor which also constitutes a coder 32. It could be mentioned that 66 indicate the oscillator for the processor and the other oscillator 67 is the clock and the time is shown in the display when nothing else is displayed. The transmit signal is phase-modulated in the modulator 33 with the coded data signal, which is fed to the transmitter 34 that is formed by a traditional transistor amplifier, and from there the signal is fed to the transmit antenna 35 here formed by a coil.

In addition to receiving the unique signal, the receiver antenna 22 also picks up the data signal of the order of 40 kHz from the control unit. What is first picked up by the hand control is the ping on this signal. The ping is used for turning on the transmitter of the hand control, which is normally turned off to minimize the consumption of power. The hand control has a power supply in the form of batteries with a voltage stabilization 68. The circuit which is activated by the ping information and turns on the receiver, is identified hereby. Cutting the power of to the receiver when not in use saves energy such the batteries last longer.

The signal is fed from the transistor amplifier in the receiver 21 to a comparator 64 in the form of an IC circuit and a filter based on four operational amplifiers, in which the carrier wave of the 40 kHz is filtered off. The data are fed via the processor 32 to the display which shows the current height of the tabletop. The user can thus directly read the current height of the tabletop.

In addition to the main tabletop 202, the table may as previously mentioned also be provided with an auxiliary tabletop 204 for, e.g., a monitor and moreover a side tabletop, both of which may be individually adjustable in height. The drives of these are likewise conceivably driven by a linear actuator. To distinguish between these three height adjustable drives, the hand control is formed with three switching keys 208I–III, one for each drive. Further there is a key 208D which should be activated in combination with one of the keys 208I–III to activate the tabletop chosen. With a further key 208U the user could choose pre-selected heights of the table and with a key 208S pre-selected heights could be stored. With the two keys 208> and 208< the table could be raised or lowered and these keys are also used in combination with the keys 208U and 208S to choose the desired settings. Further, these two keys are used to set the time.

Although the invention has been described above particularly in connection with beds and tables, it is evident that the remote control system according to the invention is generally useful, even though all fields of use have not been determined as yet. Of course, the system lends itself for use in all the fields in which electrically driven actuators are used. Another field may include, e.g., remote-controlled power driven switches and contacts, reading of measuring equipment, e.g., electricity, water and heat meters.

I claim:

1. A remote control system comprising:

at least one hand control and one or more control units, said at least one hand control and said one or more control units each comprising transmit and receive antennae, each of said one or more control units comprising a transmitter for transmitting a signal with a unique frequency, said at least one hand control comprising:

a receiver for receiving a unique signal from only one of said one or more control units from which the signal is strongest relative to the at least one hand control, a transmitter for transmitting a transmitted signal with a frequency which is a whole multiple of said strongest unique signal and, via a phase-locking circuit, is in phase with the said strongest unique signal, and means for coding the transmitted signal with instructions, each of said one or more control units comprising:

a receiver for receiving the transmitted signal from the at least one hand control, means for determining whether the transmitted signal is in phase with the signal formed by the transmitter of the one or more control units, and means for decoding and executing the instructions on the transmitted signal.

2. A remote control system according to claim 1, wherein the antennae of one of said one or more control units are formed of a wire loop.

3. A remote control system according to claim 1, wherein the transmitter of one of said one or more control units sweeps so that the unique signal therefrom oscillates within a narrow frequency range.

4. A remote control system according to claim 1, wherein each of said one or more control units are arranged to emit a further signal with a frequency which is a whole multiple of the frequency of their respective unique signals, but different from the transmitted signal from the at least one hand control, and provided with means for coding the further signal with instructions, and that said at least one hand control comprises means for decoding and executing the instructions on the further signal.

5. A remote control signal according to claim 4, wherein the further signal is used for transmitting an identification signal and the at least one hand control includes means for registering said identification signal.

6. A remote control system according to claim 1, wherein the frequency of the unique signal from one of said one or more control units is a signal divided by a whole multiple of a signal formed in the respective transmitter thereof.

7. A remote control system according to claim 1 or 2, wherein the coding of the signal transmitted from one of said at least one hand control takes place by phase-shifting selected phases 180 degrees, so that a shifted phase e.g. represents a digital 0 and a non-shifted phase represents a digital 1, and each of said one or more control units can decode the coding of the signal by detecting whether the individual phases are phase-shifted relative to what is expected.

8. An adjustable article of furniture equipped with an electric motor for performing adjustments of the article of furniture, and including a remote control system according to claim 1.

9. An article of furniture according to claim 8, including antenna means in the form of a wire loop integrated thereto.

10. A power driven actuator equipped with a remote control system according to claim 1.

11. A power driven lifting column equipped with a remote control system according to claim 1.

12. A remote control system according to claim 5, wherein the identification signal is in the form of a ping.

13. A remote control system which comprises:

a plurality of operational units, each of said plurality of operational units including a transmitter with first antenna for transmitting a transmit signal having a unique frequency, a receiver with second antenna for receiving an activation signal from a hand control unit, means for determining whether a received activation signal is in phase with said unique frequency transmit signal, and means for decoding and executing instructions within said activation signal if in phase with said unique frequency transmit signal, and a hand controller unit, said hand controller unit including a receiver with third antenna for receiving transmit signals from said plurality of operational units, means for sensing a strongest of said transmit signals, a transmitter and fourth antenna for transmitting an activation signal which is a whole multiple of said strongest transmit signal and which, by a phase locking circuit, is in phase with said strongest transmit signal, and means for coding said activation signal with instructions.

* * * * *